(12) United States Patent
Motozawa et al.

(10) Patent No.: US 6,378,929 B2
(45) Date of Patent: Apr. 30, 2002

(54) OCCUPANT PROTECTIVE APPARATUS

(75) Inventors: Yasuki Motozawa; Kazuya Yoshida, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/732,486

(22) Filed: Dec. 6, 2000

(30) Foreign Application Priority Data

Dec. 6, 1999 (JP) ............................................. 11-346009

(51) Int. Cl.7 ............................. B60N 2/02; B60N 2/04; B60N 2/06
(52) U.S. Cl. ....................... 296/68.1; 296/189; 280/274
(58) Field of Search ................. 296/68.1, 189; 280/274

(56) References Cited

U.S. PATENT DOCUMENTS

| | | | | |
|---|---|---|---|---|
| 2,959,446 | A | * 11/1960 | Thompson | 296/68.1 |
| 3,998,291 | A | * 12/1976 | Davis | 296/68.1 |
| 5,947,543 | A | * 9/1999 | Hubbard | 296/68.1 |
| 6,092,853 | A | * 7/2000 | Hubbard | 296/68.1 |
| 6,186,574 | B1 | * 2/2001 | Motozawa et al. | 296/68.1 |
| 6,193,296 | B1 | * 2/2001 | Motozawa et al. | 296/68.1 |
| 6,224,131 | B1 | * 5/2001 | Shammout | 296/68.1 |
| 6,227,563 | B1 | * 5/2001 | Talisman | 296/68.1 |
| 6,227,597 | B1 | * 5/2001 | Swann et al. | 296/68.1 |
| 6,254,164 | B1 | * 7/2001 | Kawamura et al. | 296/68.1 |

FOREIGN PATENT DOCUMENTS

| | | |
|---|---|---|
| JP | 5-238287 | 9/1993 |
| JP | 5-246252 | 9/1993 |
| JP | 5-246253 | 9/1993 |
| JP | 7-101354 | 4/1995 |

* cited by examiner

Primary Examiner—Joseph D. Pape
Assistant Examiner—Hilary Gutman (57) ABSTRACT

By supporting a weight member in such a manner that it can be moved forward to a certain degree in the case of the car collision, the seeming inertial mass of the car body in the initial stage of the car collision is reduced to generate larger deceleration than the average deceleration in the car body. The weight member is butted against a movable part which can be moved back and forth with respect to the car body. As such, the inertial mass is applied to the movable part to thereby cause the movable part to generate negative car body deceleration (or acceleration) temporarily. The whole car body decelerates with the average deceleration as an integral unit, whereby not only a preferable car body deceleration waveform for reduction of the occupant deceleration is realized, but also, the occupant deceleration can be reduced to a great extent.

7 Claims, 5 Drawing Sheets

OCCUPANT PROTECTIVE APPARATUS

BACKGROUND OF THE INVENTION

1. Field of the Invention

The present invention relates to an occupant protective apparatus which is used in a car to enhance the collision safety of the car.

2. Description of the Related Art

Recently, there has been proposed various car body structures in which, in order to enhance the protective effect of an occupant in a car collision, the deforming mode of the other remaining portions of a car body other than a car room portion of the car body in the car collision is set properly to thereby be able not only to reduce the deceleration of the car room portion of the car body but also to prevent the deformation of the other remaining portions of the car body from extending over the car room portion of the car body (see, for example, JP-A-7-101354).

On the other hand, a factor which influences the severity of injury to the occupant in a car collision, generally, is the maximum acceleration (or deceleration) of the occupant. Therefore, to reduce injury to the occupant in the car collision, first, the deceleration of the occupant (in the case of the forward collision of the car) should be reduced. Deceleration of the occupant is caused by a force which is applied to the occupant from a restricting device such as a seat belt. Generally, the seat belt functions as a spring. That is, when the occupant is moved forward due to the inertial force thereof, and the extension of the seat belt reaches its limit, the occupant deceleration reaches its peak value. The peak value of the occupant deceleration increases the more the occupant is displaced due to the inertial force. Such peak value is generally higher than the average deceleration of the car body.

In a case where the relation between the car body deceleration and occupant deceleration is assumed to be input and output with respect to a system composed of the spring (restricting device) and mass (the mass of the occupant), the maximum extension of the spring and the time of such extension can be derived from a waveform (variations in deceleration with the passage of time) that represents the deceleration of the car body. Therefore, in order to reduce the occupant deceleration in a car collision, the waveform of the car body deceleration must be adjusted in such a manner that not only the average deceleration of the car body can be reduced but also the overshoot of the spring can be minimized as much as possible.

In a conventional car body structure, a crashable zone, which is constructed between a collision reaction force generating member (such as a side beam) and the respective components of the car body structure, is disposed in the front portion of the car body. In a car collision, the crashable zone is deformed to thereby absorb collision energy caused by the car collision. As such, selectively setting the dimensions of the respective car body components so as to change characteristics of the collision reaction force, adjusts the waveform of the car body deceleration.

Figure 9:
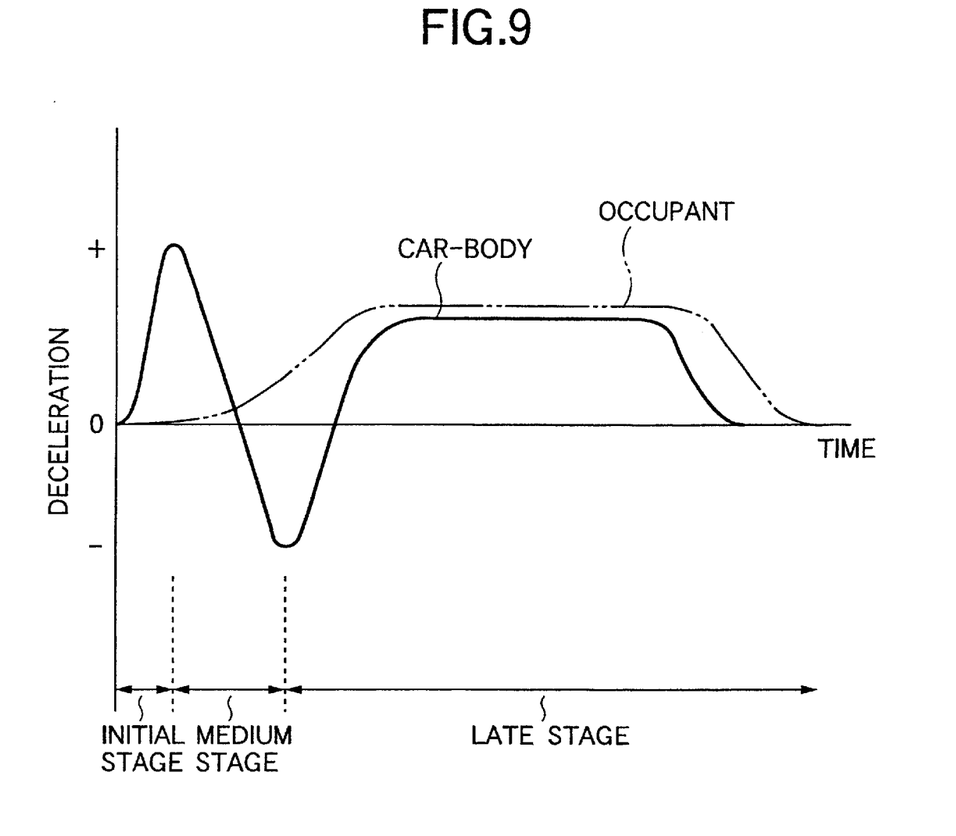

As described above, the waveform of the car body deceleration is an important factor in reducing the occupant's injuries. The waveform representing the deceleration of the body of a car at time of collision is illustrated in FIG. 9, by a solid line. The deceleration of the car body can reduce the occupant deceleration to the above-mentioned occupant damage reduction level. As shown in FIG. 9, a larger deceleration than an average deceleration is generated for a given short period of time in the initial stage of a car collision. Continuously with this, deceleration going in the opposite direction is then generated for a given period of time (a short period of time). Thereafter, the car body decelerates with average deceleration. A simulation conducted by the present inventors has confirmed that, according to such car body deceleration waveform, the occupant deceleration can be made smaller than in a constantly decelerating waveform (a rectangular waveform) where a distance (a dynamic stroke) necessary for deceleration of the car body is kept constant.

In a conventional car body structure, at the initial stage of collision, the crashable zone is always deformed so that the relatively low-strength portion of the crashable zone is deformed first and the high-strength portion thereof is deformed second. The collision reaction force, namely, the car body deceleration shows a waveform in which the car body deceleration is small in the initial stage of the collision and increases in the late stage of the car collision. That is, it cannot be said that the conventional car body structure is sufficiently effective on reduction of the occupant deceleration.

Also, conventionally, there are proposed a method for making use of crashing of the side beam to thereby obtain a constant reaction force, and a method for providing a plurality of separation walls respectively at a plurality of positions of the side beam to thereby obtain a stable reaction force (JP-A-7-101345).

However, these conventional methods truly allow the car body deceleration to approach a constant deceleration (a rectangular waveform). But it is quite difficult to obtain a more effective deceleration waveform, such as the waveform shown in FIG. 9.

Also, in an electric car, there is proposed a structure in which a battery box carried on the central portion of the car body is supported in a movable manner to reduce the mass of the car body that receives a load generated by the side beam in the initial stage of a car collision and improve a deceleration waveform of the car body (see JP-A-5-238287, JP-A-5-246252, JP-A-5-246253).

However, the above-mentioned structure is limited to an electric car with a battery box carried on the central portion of the car body. Also, the mass of a battery is small for the whole car body. A problem with this structure is that the effect thereof on the improvement in the deceleration waveform is limited.

In order to reduce the deceleration of the occupant over the above-mentioned conventional occupant protective apparatus, it is necessary to generate such a car body deceleration waveform as shown in FIG. 9.

SUMMARY OF THE INVENTION

The present invention aims at eliminating the drawbacks found in the above-mentioned conventional occupant protective apparatus. Accordingly, it is an object of the invention to provide a car occupant protective apparatus which, using a simple structure, not only properly reduces the deceleration of an occupant in a car collision, but also reduces the size of a car body.

In attaining the above object, according to the invention, an occupant protective apparatus for use in a car, comprises: a movable part 2 formed integral with the base of an occupant seat 8 (or seat 8 itself) such that when the car is in a collision, the movable part 2 moves back and forth with respect to the body of the car. An occupant restricting unit (seat belt 9) is disposed on the occupant seat 8 or on the movable part 2 for restricting an occupant seated on the occupant seat 8.

An impact absorbing part (side beam 3), absorbs collision energy generated in the car body with certain deceleration. A first load transmission member (transmission rod 6 or front side portion of the side frame 13), in the initial stage of the car collision, moves the movable part 2 backward due to transmission of a collision load caused by the car collision. A weight member (engine 11) is supported on the rear portion of the car body in such a manner that it can be moved forward with respect to the car body.

Some embodiments further comprise a second load transmission member 12 (or the rear side portion of the side frame 13), for transmitting a forward load of the weight member (engine 11) to the movable part 2, wherein, in case of a car collision, the collision load is transmitted to the movable part 2 by the first load transmission member to move the movable part backward by a given amount with respect to the car body to thereby apply high deceleration to the movable part 2 temporarily.

Thereafter, the forward load of the weight member (engine 11) moves forward due to the inertia thereof and is transmitted to the movable part 2 by the second load transmission member 12 to thereby apply a forward acceleration to the movable part 2 temporarily. As such, the collision energy is absorbed by the whole car body.

According to above-structured occupant protective apparatus, in the car collision, a load caused by the car collision is transmitted to the movable part 2 by the first load transmission member (transmission rod 6), thereby generating larger deceleration than average deceleration in the movable part 2 for a given period of time (for a short period of time); next, the forward load of the weight member (engine 11) is applied to the movable part 2 to thereby generate opposite deceleration (acceleration) in the movable part 2 for a given period of time (for a short period of time). Thereafter, the collision energy is absorbed by the impact absorbing part (side beam 3) so that the occupant's deceleration reaches an average deceleration little by little. Accordingly, the deceleration of the occupant is prevented from increasing suddenly. FIG. 9 illustrates a waveform representing the deceleration of an occupant at the time of collision, in accordance with one or more embodiments.

Also, according to another aspect of the invention, there is further included a shock absorbing structure (the second load transmission member 12 also functions as this structure) which is interposed between the car body and the weight member (engine 11). Accordingly, deceleration to be generated after generation of the forwardly going acceleration can be prevented from increasing suddenly.

The above-mentioned weight member may be an engine, a transmission, various kinds of motors, a battery, or other structure.

Horizontal arrows pointing towards or away from the occupant seat 8, indicate the seat's direction of displacement with respect to the body of the car.

DETAILED DESCRIPTION OF THE PREFERRED EMBODIMENTS

Now, a description will be given below of the mode for carrying out the invention with reference to the specific embodiments of the invention respectively shown in the accompanying drawings.

Figure 1:
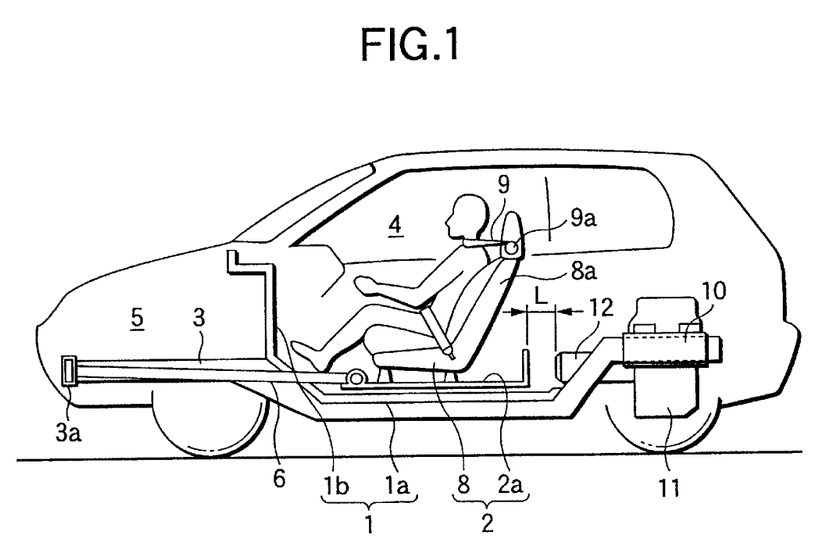
FIG. 1 is a side view of the main portions of the structure of a car body of a car incorporating therein a first embodiment of an occupant protective apparatus according to the invention.

FIG. 1 is a side view of the main portions of the structure of a car body of a car to which is applied a first embodiment of an occupant protective apparatus according to the invention. In FIG. 1, on the main frame 1 of the car body, there is disposed a movable part 2 in such a manner that it can be moved forward and backward with respect to the main frame 1. The main frame 1 is fixed integrally on the upper surfaces of a side beam 3 serving as an impact absorbing part which is disposed on the right and left side portions of the car body and also extends from the front portion of the car body to the rear portion of the car body. The main frame 1 is composed of a floor portion 1*a* of a car room 4, and a portion 1*b* which rises from the floor portion 1*a* at the boundary portion between the car room 4 and hood chamber 5 and extends up to the front edge portion of a windshield.

The movable part 2 includes a base 2*a* movably disposed on the floor portion 1*a* of the main frame 1 and a seat 8 mounted on the base 2*a*. A seat belt 9 forming a restricting device is disposed on the seat 8 as an integral part thereof. The shoulder side anchor point 9*a* of the seat belt 9 is disposed on the upper end portion of a seat back 8*a* of the seat 8. Between the seat 8 and base 2*a*, a support structure composed of a rail and a slider (neither of which are shown) is interposed in such a manner that the seat 8 can be adjusted in position in the back-and-forth direction thereof.

The movable part 2 is connected to the rear end of a transmission rod 6, which serves as a first load transmission member. The front end of the transmission rod 6 is connected to a bumper beam 3*a* similarly to the side beam 3. Therefore, in the initial stage of a car collision, a collision load caused by the collision can be transmitted to the movable part 2 through the transmission rod 6.

In an engine room formed in the rear portion of the car body, an engine 11 serving as a weight member is supported on the side beam 3 through a slider 10 in such a manner that it can be moved forward. Alternatively, the engine 11 may also be supported by a plastic support structure which is properly designed such that, in a car collision, it is deformed to thereby move forward with respect to the side beam 3 or the proper frame of the car body.

Also, a second load transmission member 12 is provided on the engine 11 to project forward from the engine 11. The second load transmission member 12 is spaced by a given distance L from the movable part 2. In a case where the engine 11 is moved forward in a car collision, it can be butted against the movable part 2 to thereby transmit a forward load, due to the inertia thereof, to the movable part 2.

Further, the second load transmission member 12 has, for example, a honeycomb structure which serves also as a shock absorbing structure. That is, when the second load transmission member 12 is butted against the movable part 2 (the butting operation will be discussed later), it transfers a shock load caused by the butting operation to the movable part 2 while dampening the shock load.

Figure 2:
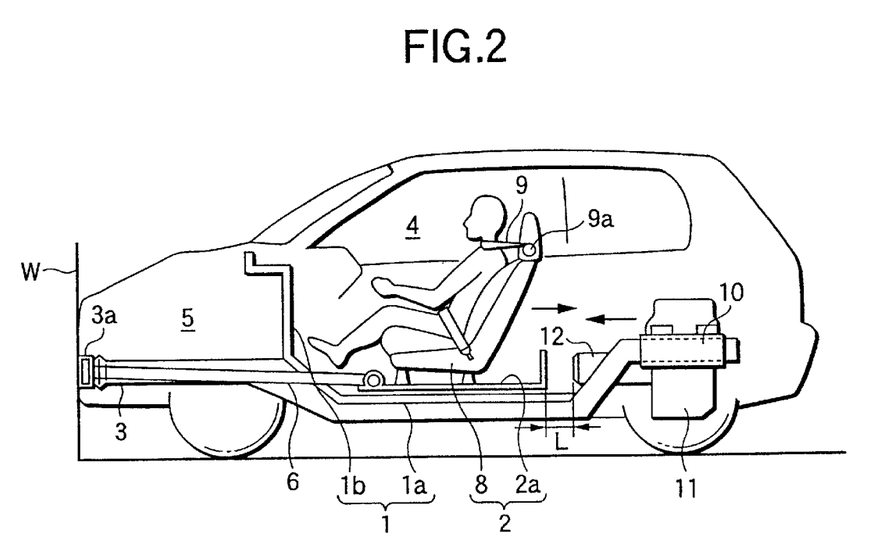
FIG. 2 is a side view corresponding to FIG. 1, showing the initial stage of the collision of the car.

Now, a description will be given below of the collision state of the thus structured car with reference to FIGS. 2 to 4. FIG. 2 is a side view of the main portions of the car body similar to FIG. 1 and shows an initial stage of the car collision. For example, in case where the car collides with an obstacle W, the front panel portion of the outer plate of the car body is crashed and, immediately thereafter, the forward projecting end portion of the side beam 3 is butted against the obstacle W. Due to the impact, the side beam 3 starts to crash and generates a predetermined deceleration. At the same time, a rearward load is transmitted to the movable part 2 through the transmission rod 6, so that the movable part 2 is moved backward. Therefore, in the movable part 2, there is generated for a given period of time (a short period of time) a deceleration which is larger than the average deceleration. Also, since the engine 11 serving as a weight member continues to move forwardly due to the inertia thereof, the mass of the whole car at the time seemingly decreases by an amount equivalent to the engine 11. Due to this, for a given period of time (a short period of time), the car body is decelerated. This deceleration is larger than the average deceleration. As a result, the seat belt load of the seat 8 increases earlier than that of a conventional occupant protective apparatus. As such, the occupant also generates earlier.

Figure 3:
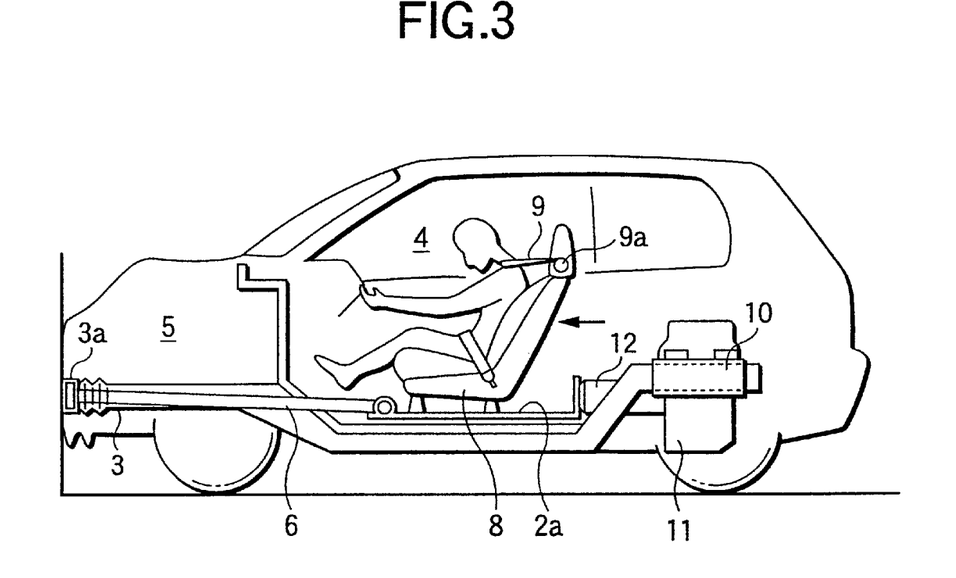
FIG. 3 is a side view corresponding to FIG. 1, showing the middle stage of the collision of the car.

In the middle stage of the car collision, shown in FIG. 3, the engine 11 is moved by a distance L and the leading end of the second load transmission member 12 is butted against the rear end of the movable part 2, thereby applying a forward load to the movable part 2. Due to this, movable part 2 is decelerated in the opposite (i.e., forward) direction, whereby the relative movement of the movable part 2 with respect to the car body stops, while deforming the transmission rod 6.

Such deceleration in the direction of the collision provides negative deceleration as shown in FIG. 9. That is, due to this negative deceleration, while receiving the tensile force of the seat belt 9, the forward movement of the engine 11 relative to the car body is stopped. The car body deceleration in FIG. 9, as described above, is based on the shoulder side anchor point 9a.

With respect to seat belt 9, the distance L between the second load transmission member 11 and movable part 2, and the transmission rod 6 are designed so that the speed and deceleration of the occupant can be equal to the speed and deceleration of the seat 8 at the time when negative deceleration of the seat 8 is ended. That is, at the time when the forward movement of the engine 11 relative to the car body has ended, the occupant is not displaced in relation to the seat 8, but becomes integral with the seat 8 and continues to decelerate. As such, a ride-down effect can be used to the fullest.

Figure 4:
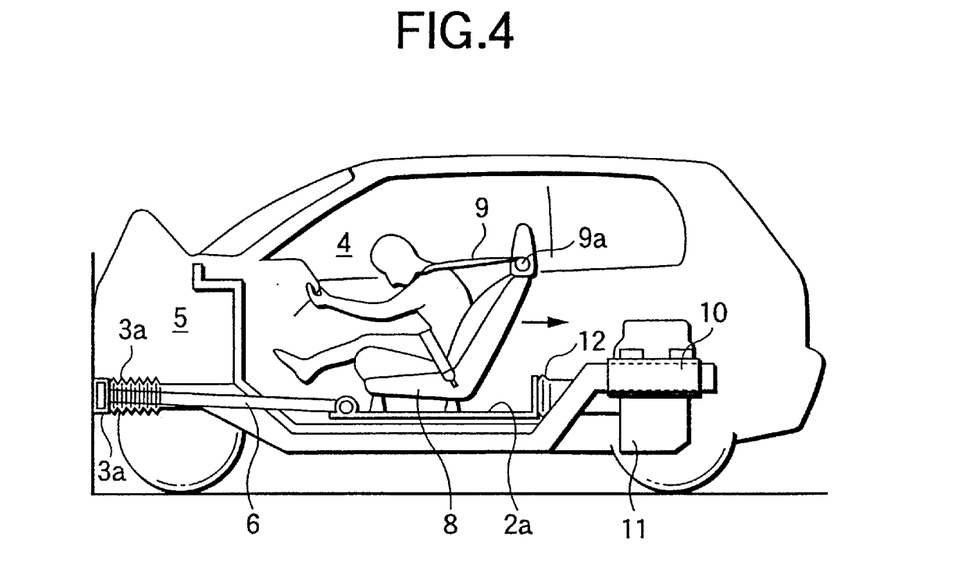
FIG. 4 is a side view corresponding to FIG. 1, showing the late stage of the collision of the car.

In the late stage of the car collision shown in FIG. 4, due to the above-mentioned butting contact of the second load transmission member 12 with the rear end of the movable part 2, the transmission rod 6 and the second load transmission member 12 having the shock absorbing structure are gradually crashed to thereby increase the shock absorbing amount thereof gradually. Due to the stopping of the forward movement of the engine 11 relative to the car body, the deceleration of the movable part 2 is again increased gradually.

Thereafter, the movable part 2 becomes substantially integral with the main frame 1. As the crash of the side beam 3 and transmission rod 6 advances, movable part 2 and main frame 1 are further integrated, so that the occupant is repositioned at a lower level with respect to the body of the car. Consequently, the car body deceleration and occupant deceleration become almost equal to each other until the car collision ends (see FIG. 9).

In the car collision, the car body is structured such that it can be deformed in the above-mentioned manner and, as shown by the graphical representation in FIG. 9, there can be generated proper variations in the deceleration of the car body and occupant. Also, even in a case where a sufficient speed difference between the movable part 2 and main frame 1 cannot be secured (e.g., the portion of FIG. 9 in which the car body deceleration becomes negative), when compared with the conventional car, the ride-down state of the occupant in the late stage of the car collision can be enhanced.

Figure 5:
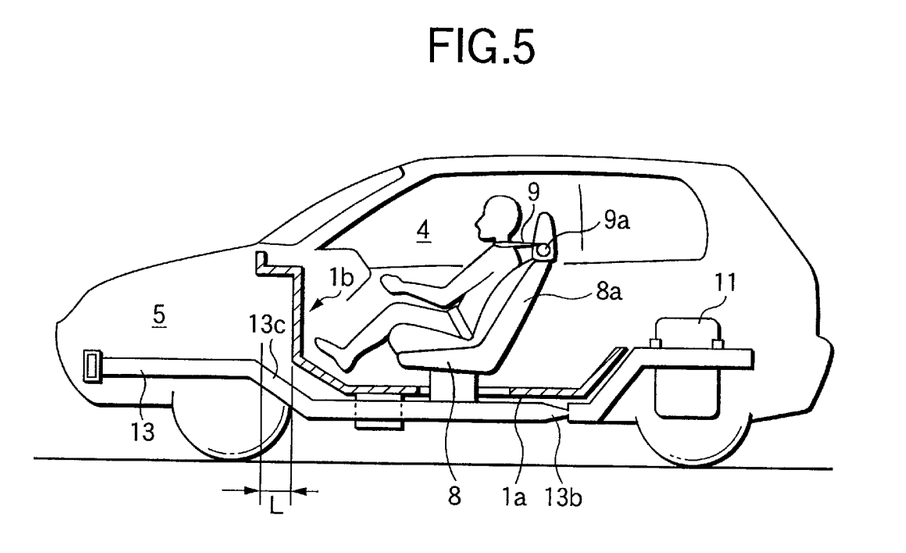
FIG. 5 is a side view of the main portions of the structure of a car body of a car incorporating therein a second embodiment of an occupant protective apparatus according to the invention.

FIG. 5 is similar to FIG. 1 and illustrates a sectional side view of the main portions of the body structure of a car to which a second embodiment of an occupant protective apparatus is applied according to another embodiment. In FIG. 5, similar parts to those in the first embodiment are given the same designations and thus the detailed description thereof is omitted here.

In the present structure, the front side portion of a side frame 13 is supported on the main frame 1 in such a manner that it can be moved backward by a given distance L with respect to the main frame 1. Also, an engine 11 is mounted on the rear portion of the side frame 13. On the front side portion of the engine 11, the side frame 13 includes a neck portion 13b serving as a shock absorbing structure.

In order for the engine 11 to move forward with respect to the main frame 1, when a head-on collision occurs, the shock-absorbing structure receives a collision load and is buckled and deformed at the neck portion 13b. The deformation load of the neck portion 13b is set such that the neck portion 13b provides no obstacle in the normal running operation of the car. In a head-on collision, the neck portion 13b receives the collision load and is thereby deformed. As a result, the engine 11 moves quickly in the forward direction.

Further, the side frame 13 is fixed to the floor portion 1a of the main frame 1 in the portion thereof between the neck portion 13b and the mounting portion of the engine 11. The relative degree of displacement between the rear portion of the side frame 13 and the neck portion 13b, and between the main frame 1 and the engine 11 with respect to the front portion of the side frame 13, are respectively determined by the distance L between the rising portion 1b and the front crank portion 13c of the side frame 13.

On the other hand, the seat 8 serving as a movable part is mounted directly on the front end of the side frame 13, rather than the neck portion 13b. Therefore, in the present structure, the front side portion of the side frame 13 functions as a first load transmission member, whereas the rear side portion thereof functions as a second load transmission member. The other remaining portions of the present structure are similar to those of the first embodiment.

Figure 6:
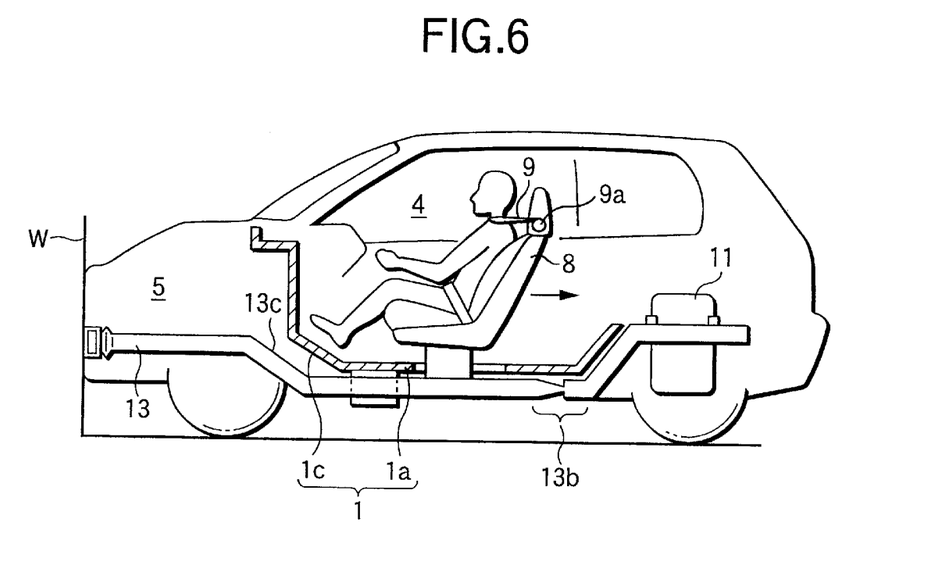
FIG. 6 is a side view corresponding to FIG. 5, showing the initial stage of the collision of the car.

Now, a description will be given below of the collision state of the car structured in the above-mentioned manner with reference to FIGS. 6 through 8. FIG. 6 (similar to FIG. 5) illustrates a sectional side view of the main portions of the car body structure of a car, at the initial stage of a car collision. For example, in a case where the car collides with an obstacle W, the front panel portion of the outer plate of the car body is crashed and, immediately thereafter, the car body's forward projecting end portion of the side beam 13 is butted against the obstacle W. The front end portion of the side beam 13 start to crash, thereby generating a certain level of deceleration.

At the same time, due to the forward loads of the engine 11 and main frame 1, the neck portion 13b starts to deform, while the engine 11 and main frame 1 start to move forward with respect to the front side portion of the side beam 13. Therefore, the mass of the whole car at the time seemingly decreases by an amount equivalent to the mass of engine 11 and main frame 1, so that a deceleration larger than the average deceleration is generated for a given period of time (a short period of time). This deceleration is transferred to the seat 8 through the front side portion of the side beam 13. Due to this, the seat belt load of the seat 8 increases earlier than in the conventional structure and thus the occupant decelerates earlier.

Figure 7:
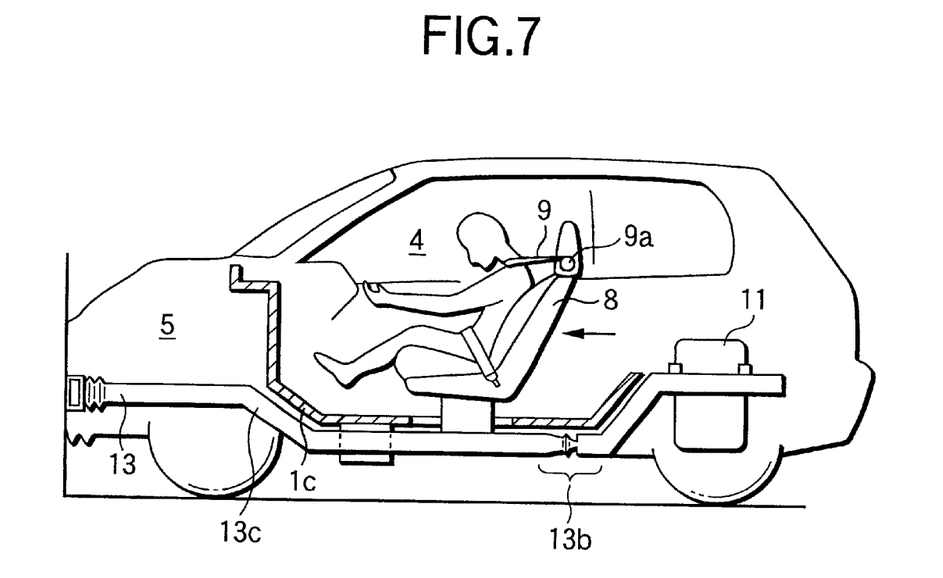
FIG. 7 is a side view corresponding to FIG. 5, showing the middle stage of the collision of the car.

In the middle stage of the collision of the car shown in FIG. 7, the neck portion 13b serving as a shock absorbing structure is deformed. Here, the forward loads of the engine 11 and main frame 1, which move with a relative speed toward the seat 8 and also have sufficiently large masses, are transferred to the seat 8 through the rear side portion of the side frame 13. Due to this, the generated deceleration is towards the opposite direction, that is, the forward direction.

Here, preferably, the characteristics of the seat belt and the generating load of the neck portion 13b serving as a shock absorbing structure may be designed in such manner that the speed and deceleration of the occupant can be equal to the speed and deceleration of the seat 8 at the time when generation of the opposite-direction acceleration of the seat 8 has ended.

Figure 8:
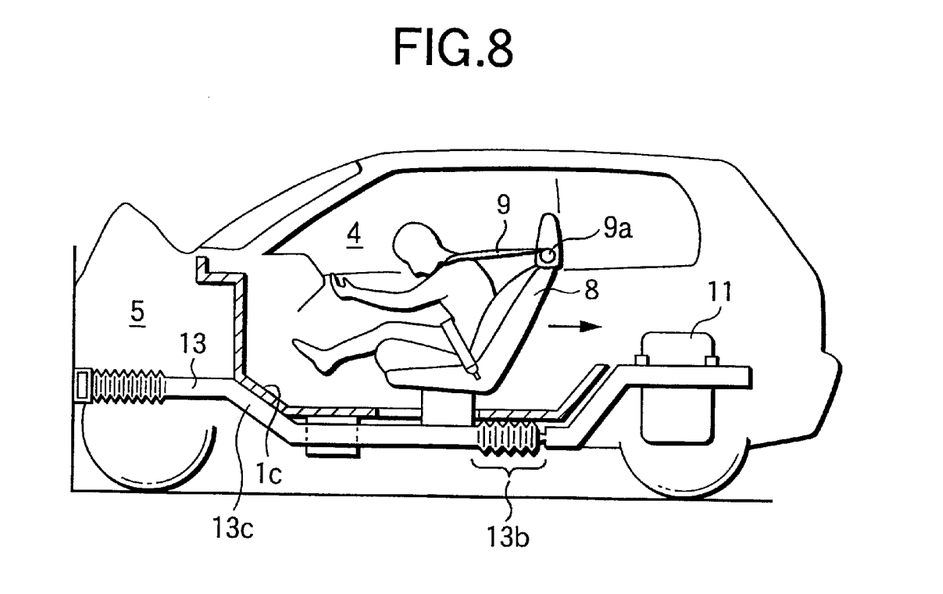
FIG. 8 is a side view corresponding to FIG. 5, showing the late stage of the collision of the car; and, FIG. 9 is a graphical representation of the desired waveforms of the car body deceleration and occupant deceleration.

In the late collision stage shown in FIG. 8, even after the neck portion 13b is deformed, as the peripheral portion of the neck portion 13b is buckled and deformed, the deceleration of the movable part 2 is again increased gradually until the forward movement of the engine 11 with respect to the side frame 13 is stopped. The rising portion 1c is butted against the front crank portion 13c of the side frame 13 to thereby stop the relative movement between the side frame 13 and the main frame 1.

As a result, the side frame 13, main frame 1 and engine 11 form a substantially integral unit. As the crash of the side frame 13 advances, the occupant is displaced to a lower position with respect to the car body. Thus, the car body deceleration and the occupant deceleration are kept almost equal to each other until the car collision has ended (see FIG. 9).

Here, preferably, the load that is generated by the front side portion of the side frame 13 may be set so that the deceleration of the car body at that moment is equal to the target deceleration of the occupant.

As has been described heretofore, in an occupant protective apparatus according to the invention, by supporting a weight member in such a manner that it can be moved forward to a certain degree in the case of the car collision, the seeming inertial mass of the car body in the initial stage of the car collision is reduced to thereby generate a deceleration which is larger than the average deceleration in the whole car body including a seat. Thereafter, the weight member is butted against a movable part which can be moved back and forth with respect to the car body. Further, the inertial mass is applied to the movable part to thereby cause the movable part, that is, a seat to generate negative car body deceleration (acceleration) temporarily. As a result, the whole car body decelerates with average deceleration as an integral unit.

As a result, not only a preferable car body deceleration waveform for reduction of the occupant deceleration can be realized but also, even in the case of deformation of a smaller car body, the occupant deceleration can be reduced to a great extent. Also, since the present occupant protective apparatus can be realized with a simple structure, the car body incorporating this apparatus therein can be made compact.

Further, when compared with a structure in which the occupant deceleration is reduced using a load limiter as a restricting device, the displacement of the occupant with respect to the car body can be reduced, which in turn can reduce the possibility of occurrence of a secondary collision.

While only certain embodiments of the invention have been specifically described herein, it will be apparent that numerous modifications may be made thereto without departing from the spirit and scope of the invention.

What is claimed is:

1. An occupant protective apparatus for use in a car, comprising:

a movable part formed integral with an occupant seat and movable back and forth with respect to a car body in a collision of the car;

an occupant restricting unit disposed on one of said occupant seat and said movable part for restricting an occupant seated on said occupant seat;

an impact absorbing part absorbing a collision energy generated in the car body with a predetermined deceleration in the car collision;

a first load transmission member, in an initial stage of the car collision, for moving said movable part backward in response to a collision load caused by the car collision;

a weight member supported on a rear portion of said car body, movable forwardly with respect to the car body in the car collision; and, a second load transmission member for transmitting a forward load of said weight member to said movable part in a case where said weight member is moved forwardly by a predetermined amount.

2. The occupant protective apparatus according to claim 1, further comprising:

a shock absorbing structure interposed between said car body and said weight member.

3. The occupant protective apparatus according to claim 1, wherein, in the car collision, the collision load caused by the car collision is transferred to said movable part by said first load transmission member to move said movable part backward by a predetermined amount with respect to said car body to thereby apply a high deceleration to said movable part temporarily, the forward load of said weight member moving forward due to the inertia thereof and transmitted to said movable part by said second load transmission member to thereby apply a forwardly directed acceleration to said movable part temporarily, thereby the collision energy is absorbed by the car body.

4. The occupant protective apparatus according to claim 1, wherein said weight member includes at least one of an engine, a transmission, a motor and a battery.

5. The occupant protective apparatus according to claim 1, wherein said impact absorbing part is a side beam connected to a bumper beam, and said first load transmission member is a transmission rod connected to said bumper beam and said movable part.

6. An occupant protective apparatus for use in a car, comprising:

a main frame having a floor portion;

an occupant seat movable back and forth with respect to said main frame in a collision of the car;

an occupant restricting unit disposed on said occupant seat for restricting an occupant seated on said occupant seat;

a side frame for absorbing a collision energy generated in a car body with a predetermined deceleration in a car collision, said side frame including:
- a front portion attached with said occupant seat;
- a rear portion fixed to said floor portion; and
- a neck portion disposed between said front portion and said rear portion to be buckled in the car collision; and a weight member supported on the rear portion of said side frame in such a manner as to be movable forwardly with respect to the car body in the car collision.

7. The occupant protective apparatus according to claim 6, wherein said side frame has a restricting portion abutting said main frame in the car collision so as to restrict a moving amount of said occupant seat with respect to said main frame in the car collision.

\* \* \* \* \*